US010088996B2

(12) United States Patent
Arning et al.

(10) Patent No.: US 10,088,996 B2
(45) Date of Patent: Oct. 2, 2018

(54) AUTOMATION OF USER INTERFACE TO FACILITATE COMPUTER-BASED INSTRUCTION

(71) Applicant: International Business Machines Corporation, Armonk, NY (US)

(72) Inventors: Andreas Arning, Tuebingen (DE); Klaus Rindtorff, Weil im Schoenbuch (DE)

(73) Assignee: International Business Machines Corporation, Armonk, NY (US)

(*) Notice: Subject to any disclaimer, the term of this patent is extended or adjusted under 35 U.S.C. 154(b) by 266 days.

(21) Appl. No.: 14/736,621

(22) Filed: Jun. 11, 2015

(65) Prior Publication Data

US 2016/0364117 A1 Dec. 15, 2016

(51) Int. Cl.
*G06F 3/0484* (2013.01)
*G06F 3/0489* (2013.01)
*G06F 3/0481* (2013.01)
*G09B 7/00* (2006.01)

(52) U.S. Cl.
CPC ........ *G06F 3/04847* (2013.01); *G06F 3/0481* (2013.01); *G06F 3/04895* (2013.01); *G09B 7/00* (2013.01)

(58) Field of Classification Search
CPC ............................. G06F 3/0484; G06F 3/0481
See application file for complete search history.

(56) References Cited

U.S. PATENT DOCUMENTS

| 5,535,422 | A | 7/1996 | Chiang et al. | |
|---|---|---|---|---|
| 7,415,714 | B2 | 8/2008 | Chapman | |
| 8,298,059 | B2 | 10/2012 | Ivory et al. | |
| 8,374,829 | B2 | 2/2013 | Jakobsen et al. | |
| 2004/0224775 | A1* | 11/2004 | Wood | A63F 13/08 463/43 |
| 2010/0058185 | A1* | 3/2010 | Commarford | G06F 9/4446 715/708 |
| 2010/0092930 | A1* | 4/2010 | Fletcher | G09B 5/062 434/178 |
| 2013/0311956 | A1* | 11/2013 | Li | G06F 3/017 715/863 |

(Continued)

FOREIGN PATENT DOCUMENTS

EP 1637994 A1 3/2006

OTHER PUBLICATIONS

Gupta, et al., "DuploTrack: A Real-time System for Authoring and Guiding Duplo Block Assembly", UIST'12, Oct. 7-10, 2012, Cambridge, Massachusetts, USA, Copyright 2012 ACM 978-1-4503-1580—Jul. 12, 2010, 13 pages.

(Continued)

*Primary Examiner* — David Choi
(74) *Attorney, Agent, or Firm* — Adolph Bohnstedt; Arnold B. Bangali

(57) ABSTRACT

One or more processors provide a first instruction to a first user. One or more processors receive a user input in response to the first instruction provided to the first user. One or more processors determine whether the user input is a correct response to the first instruction. Responsive to determining that the first user input to the first instruction is the correct input, one or more processors provide a second instruction to the first user.

14 Claims, 8 Drawing Sheets

(56) References Cited

U.S. PATENT DOCUMENTS

| | | | |
|---|---|---|---|
| 2015/0039987 A1* | 2/2015 | Soulier | G06F 17/2247 715/224 |
| 2015/0243179 A1* | 8/2015 | Zaslavsky | G06F 17/30321 434/327 |
| 2016/0170951 A1* | 6/2016 | Yao | G06F 17/243 715/224 |
| 2016/0364117 A1* | 12/2016 | Arning | G06F 3/04847 |

OTHER PUBLICATIONS

Harms, et al., "Automatically Generating Tutorials to Enable Middle School Children to Learn Programming Independently", IDC '13, Jun. 24-27, 2013, New York, NY, USA, ACM 978-1-4503-1918—Aug. 13, 2006, 9 pages.

IBM, "Process Choreographer Samples—Navigation", provided in the main idea of disclosure dated Jun. 1, 2014, 4 pages,<https://publib.boulder.ibm.com/bpcsamp/navigationV70.html?gettingStarted&gettingStarted/helloWorld.html>.

Pongnumku, et al., "Pause-and-Play: Automatically Linking Screencast Video Tutorials with Applications", Paper Session: Social Learning UIST'11, Oct. 16-19, 2011, Santa Barbara, CA, USA, pp. 135-144, Copyright 2011 ACM 978-1-4503-0716—Jan. 11, 2010.

"Fast scriptable desktop automation with hotkeys Creating your own apps and macros has never been easier been easier (http://ahkscri pt.org /docs/Tutorial.htm)", AutoHotkey: macro and automation Windows scripting language, provided in the main idea of disclosure dated Jun. 1, 2014, 3 pages, <http://www.autohotkey.com/>.

"Build it yourself", Provided in the main idea of disclosure dated Jun. 1, 2014, 22 pages, <https://publib.boulder.ibm.com/bpcsamp/gettingStarted/helloWorld/buildItYourself.html>.

* cited by examiner

AUTOMATION OF USER INTERFACE TO FACILITATE COMPUTER-BASED INSTRUCTION

BACKGROUND OF THE INVENTION

The present invention relates generally to the field of user interface design, and more particularly to the automation of user interface to facilitate computer-based instruction.

User interface design (UID) is the design of user interfaces for machines and software, such as computers, home appliances, mobile devices, and other electronic devices, with the focus on maximizing the user experience. The purpose of user interface design is to make the user's interaction as simple and efficient as possible in terms of accomplishing user goals.

Computer-based instruction (CBI) is defined as the use of a computing device in the delivery of instruction. Other similar terms include: computer-based training (CBT), computer-assisted instruction (CAI), and computer-assisted learning (CAL).

SUMMARY

Embodiments of the present invention provide a method, system, and program product for facilitating computer-based instruction. One or more processors provide a first instruction to a first user. One or more processors receive a user input in response to the first instruction provided to the first user. One or more processors determine whether the user input is a correct response to the first instruction. Responsive to determining that the first user input to the first instruction is the correct input, one or more processors provide a second instruction to the first user.

DETAILED DESCRIPTION

Embodiments of the present invention recognize that following a computer-generated list of instructions, which require user input into a computing device, should not require a user to remember what instruction they are on. Embodiments of the present invention recognize that following a computer-generated list of instructions, which require user input into a computing device, should not require a user to manually input his or her readiness for a next instruction. Embodiments of the present invention provide a method for a user to follow a computer-generated list of instructions, wherein the method does not require the user to remember which instruction they are on or to manually input their readiness for the next instruction.

The present invention will now be described in detail with reference to the Figures.

Figure 1:
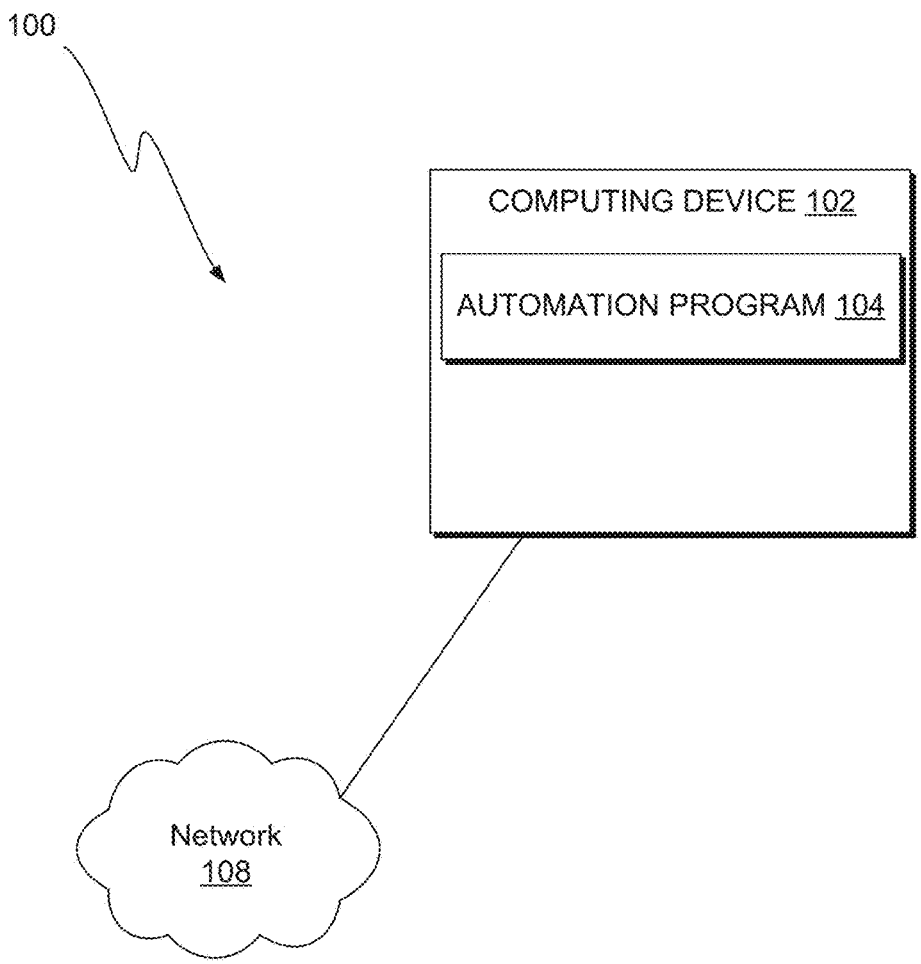
FIG. 1 is a functional block diagram illustrating a computer-based instruction environment, in accordance with an exemplary embodiment of the present invention.

FIG. 1 is a functional block diagram illustrating a computer-based instruction environment, generally designated 100, in accordance with one embodiment of the present invention. Computer-based instruction environment 100 includes computing device 102 connected over network 108. Computing device 102 includes automation program 104.

In various embodiments of the present invention, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices capable of executing automation program 104. Computing device 102 may include internal and external hardware components, as depicted and described in further detail with respect to FIG. 8.

In the depicted exemplary embodiment, automation program 104 is stored on computing device 102. However, in other embodiments, automation program 104 may be stored externally and accessed through a communication network, such as network 108. Network 108 can be, for example, a local area network (LAN), a wide area network (WAN) such as the Internet, or a combination of the two, and may include wired, wireless, fiber optic or any other connection known in the art. In general, network 108 can be any combination of connections and protocols that will support communications between computing device 102 and automation program 104, in accordance with a desired embodiment of the present invention.

In exemplary embodiments, automation program 104 tracks the progress of one or more users as they follow a computer-generated set of instructions. Once the one or more users complete the input required by an instruction, automation program 104 automatically provides the next instruction without requiring the one or more users to act. Automation program 104 continues providing instructions automatically after each user input until the final instruction has been followed or answered, respectively, by the one or more users. Thus, the user(s) are not required to track where the user(s) are in the list of instructions nor are the users required to manually retrieve the next instruction.

Figure 2:
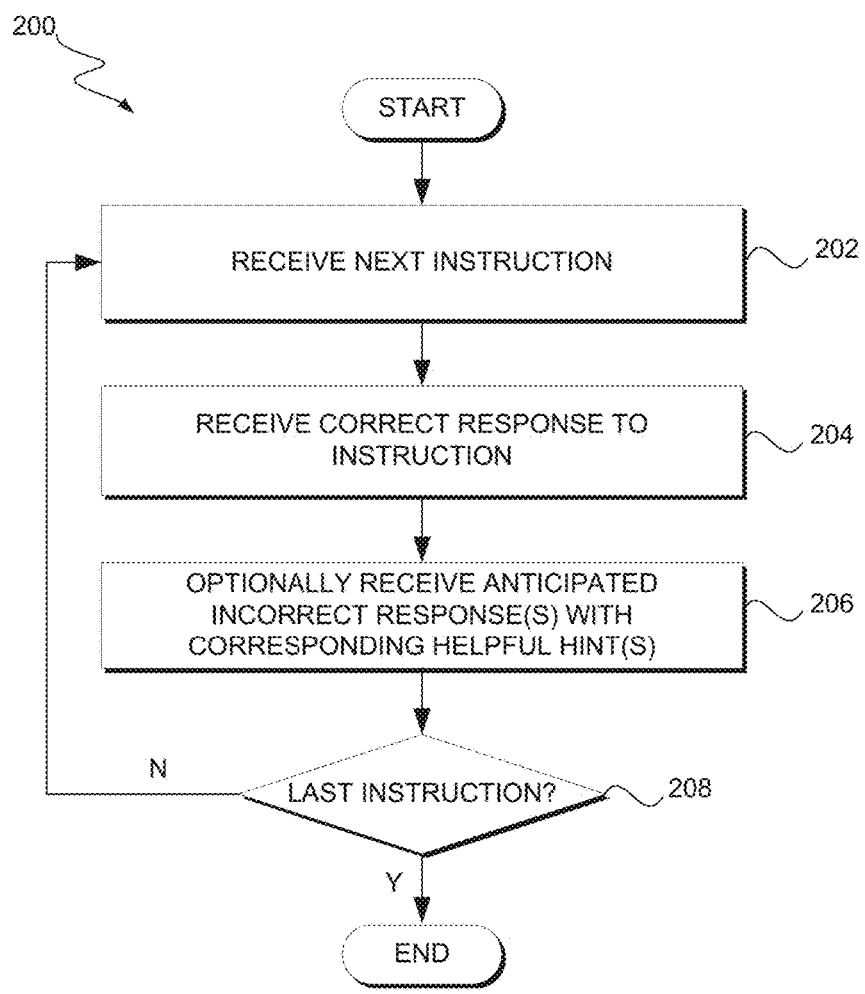
FIG. 2 illustrates operational processes when creating an application file using an automation program on a computing device within the environment of FIG. 1, in accordance with an exemplary embodiment of the present invention.

FIG. 2 illustrates operational processes, generally designated 200, when creating an application file using automation program 104 on computing device 102 within the environment of FIG. 1, in accordance with an exemplary embodiment of the present invention. It should be appreciated that FIG. 2 provides only an illustration of one possible order for the depicted steps and decisions. FIG. 2 does not imply any limitations with regard to other possible orders for the depicted steps and decisions in which different embodiments may be implemented. Many modifications to the depicted steps and decisions may be made.

In step 202, automation program 104 receives an instruction from a creator of an application file using automation program 104. In various embodiments, the application file serves to tutor a future user of the file. The instruction is not directed to automation program 104. The instruction is meant to be followed or answered by a user who, for example, will be taking a tutorial at some point in the future on a computing device executing automation program 104.

In step 204, automation program 104 receives from the creator a correct response to the step 202 instruction. In various embodiments, the correct response is a given input into a GUI. For example, the correct response includes clicking on a link, button, tab, icon, etc. in an open window on a display of a computing device. In other embodiments, the correct response in step 204 is a given input into a text-based user interface. For example, the correct response includes entering text as an answer.

In step 206, automation program 104 optionally receives from the creator one or more anticipated incorrect response(s) to the step 202 instruction. In various embodiments, the anticipated incorrect response(s) are each accompanied by one or more creator-supplied hint(s). The hint(s) guide a future user, who provides the anticipated incorrect response, to the correct response. For example, a creator of a tutorial on automation program 104 provides a correct response in step 204 that includes clicking on a link, button, tab, icon, etc., which is surrounded by other clickable objects (e.g., other links, buttons, tabs, icons, etc.). The creator of the tutorial provides anticipated errors in step 206 to automation program 104 in which a user of the tutorial clicks on an incorrect clickable object. The creator of the tutorial also provides one or more hints to automation program 104 in step 206. The helpful hints are provided to assist a user of the tutorial when the user erroneously clicks on the one or more of the other clickable objects. The helpful hints provide guidance so that the user picks the correct link, button, tab, icon, etc. on a subsequent attempt.

In decision 208, if the creator has not supplied the last instruction (i.e., "N"), then automation program 104 returns to step 202. When the creator has supplied the last instruction (i.e., "Y"), the document is saved as a file in persistent storage for subsequent use and, optionally, modification.

Figure 3:
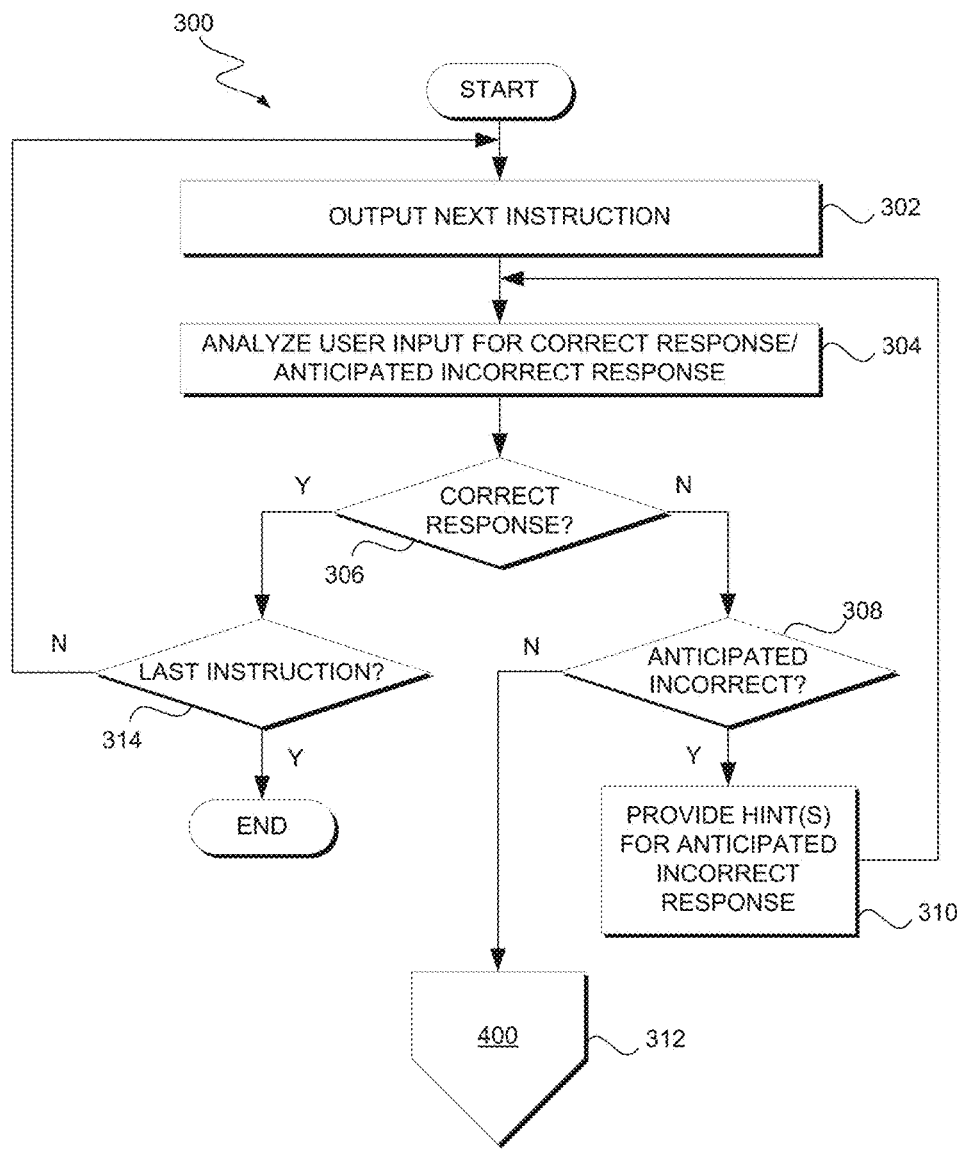
FIG. 3 illustrates operational processes when using an application file with the automation program on the computing device within the environment of FIG. 1, in accordance with an exemplary embodiment of the present invention.

FIG. 3 illustrates operational processes, generally designated 300, when using a tutorial file on automation program 104 on computing device 102 within the environment of FIG. 1, in accordance with an exemplary embodiment of the present invention. In various embodiments, the tutorial file was created using automation program 104 following the processes discussed in FIG. 2. It should be appreciated that FIG. 3 provides only an illustration of one possible order for the depicted steps and decisions. FIG. 3 does not imply any limitations with regard to other possible orders for the depicted steps and decisions in which different embodiments may be implemented. Many modifications to the depicted steps and decisions may be made.

In step 302, automation program 104 outputs an instruction for a user so that the user can follow the instruction. In various embodiments, the instruction was added by a creator of the tutorial file using automation program 104 in step 202 of FIG. 2.

In various embodiments, the instruction output by automation program 104 in step 302 is one or both of textual and graphical in nature. For example, an instruction output in step 302 directs a user to perform a task using one or both of words and numbers. Alternatively, a graphical instruction is one where the task that is being requested is visually shown to the user via a GUI. In some scenarios, the instruction output by automation program 104 in step 302 is both textual and graphical.

In step 304, automation program 104 analyzes the user input for a correct response to the instruction. In addition, automation program 104 optionally analyzes the user input for an anticipated incorrect response to the instruction. In various embodiments, the correct response and anticipated incorrect response(s) were added in step 204 and 206, respectively, of FIG. 2 by a creator of the tutorial file using automation program 104.

Automation program 104 receives inputs from the user in response to the output instructions. In some embodiments, the correct or incorrect response(s) are inputs into a GUI. In other embodiments, the correct response or incorrect response(s) are inputs into a text-based user interface. In various embodiments, a keylogging subprogram within automation program 104 tracks the user input and compares it to the input given by the creator of the tutorial file. The keylogging subprogram is capable of tracking user input such as keystrokes, mouse movement, mouse clicking, changed content in windows, opening and closing of windows, etc.

In decision 306, automation program 104 determines whether the user input is a correct response. For example, a keylogging subprogram within automation program 104 determines that a user input via a mouse click or keystroke matches the mouse click or keystroke input that was entered by a creator of the tutorial file in step 204 (FIG. 2). Based on that data, automation program 104 determines the user input is correct. However, if the keylogging subprogram within automation program 104 determines that a user input via a mouse click or keystroke does not match the mouse click or keystroke input that was entered by a creator of the tutorial file in step 204 (FIG. 2), then automation program 104 determines the user input is incorrect. If automation program 104 determines that the user input is an incorrect response for decision 306 (i.e., "N"), then automation program 104 goes to decision 308. If automation program 104 determines the user input is a correct response for decision 306 (i.e., "Y"), then automation program 104 goes to decision 310.

In decision 308, automation program 104 optionally determines whether the user incorrect response was an anticipated incorrect response. For example, a keylogging subprogram within automation program 104 determines that a user input via a mouse click or keystroke does not match the mouse click or keystroke input that was entered by a creator of the tutorial file in step 206 (FIG. 2). Based on that data, automation program 104 determines the user input is not an anticipated incorrect response. However, if the keylogging subprogram within automation program 104 determines that an incorrect user input via a mouse click or keystroke does match the mouse click or keystroke input that was entered by a creator of the tutorial file in step 206 (FIG. 2), then automation program 104 determines the user input is an anticipated correct response. If automation program 104 determines that the user incorrect response was an anticipated incorrect response for decision 308 (i.e., "Y"), then automation program 104 goes to step 310. If automation program 104 determines the incorrect user response was not an anticipated incorrect response for decision 308 (i.e., "N"), then automation program 104 goes to off-page reference 312 (i.e., the operational processes detailed in FIG. 4).

In step 310, automation program 104 provides one or more helpful hints to the user after the user makes an incorrect response that was anticipated. In various embodiments, the helpful hints were added in step 206 of FIG. 2 by a creator of the tutorial file using automation program 104. In other embodiments, the helpful hints are incorporated over a period of time as a tutorial is being taken by users or, alternatively, being beta tested. For example, a tutorial is being taken by a user or a beta-tester and an instruction is followed by an unanticipated response. In one embodiment, automation program 104 queries the user or beta tester to provide hints that the user or beta tester would have found useful given that the user or beta tester finally guessed or were given the correct response. In one embodiment, automation program 104 displays the hint with text. In another embodiment, automation program 104 displays the hint with graphics. In other embodiments, automation program 104 uses both text and graphics to output helpful hints to a user.

After providing one or more helpful hints to the user or beta tester of the tutorial in step 310, automation program 104 loops back to step 304 wherein the user or beta tester answer is analyzed for a correct response or anticipated incorrect response.

In decision 314, automation program 104 determines whether the user input was a correct response. For example, a keylogging subprogram within automation program 104 determines that a user input via a mouse click or keystroke does not match the mouse click or keystroke input that was entered by a creator of the tutorial file in step 204 (FIG. 2). Based on that data, automation program 104 determines the user input is not a correct response. However, if the keylogging subprogram within automation program 104 determines that a user input via a mouse click or keystroke does match the mouse click or keystroke input that was entered by a creator of the tutorial file in step 204 (FIG. 2), then automation program 104 determines the user input is a correct response. If automation program 104 determines that the user input was a correct response for decision 314 (i.e., "Y"), then automation program 104 goes to decision 316. If automation program 104 determines the user input was not a correct response for decision 314 (i.e., "N"), then automation program 104 goes to decision 306.

In decision 316, automation program 104 determines whether the user has responded to the last instruction. If automation program 104 determines that the user has responded to the last instruction for decision 316 (i.e., "Y"), then automation program 104 ends the tutorial. If automation program 104 determines the user has not responded to the last instruction for decision 316 (i.e., "N"), then automation program 104 goes to step 302.

Figure 4:
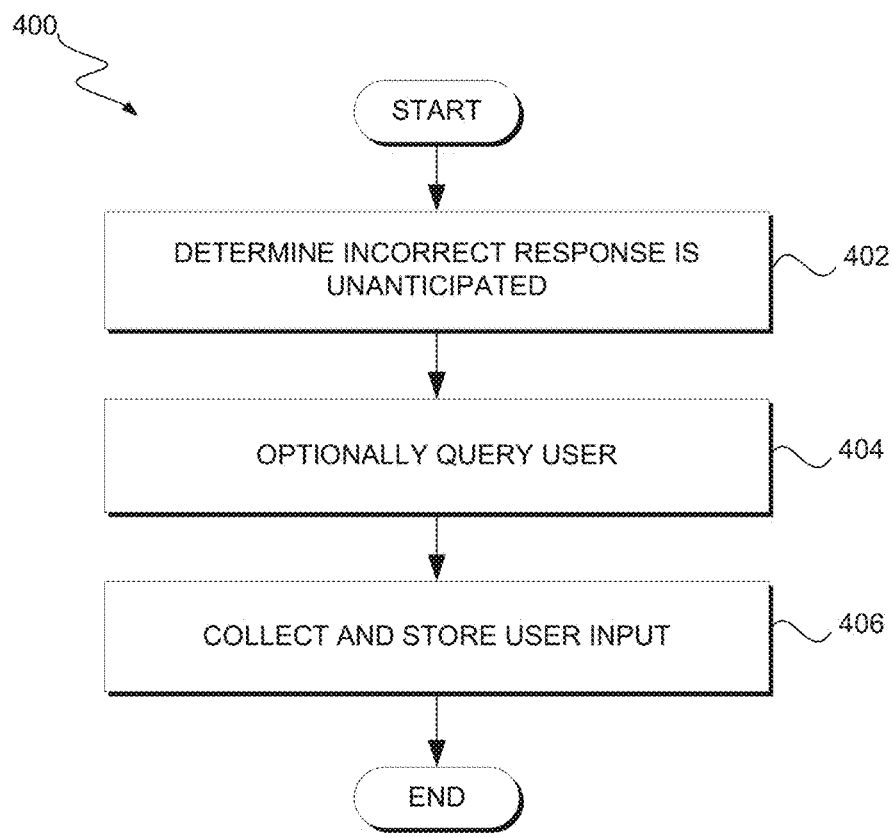
FIG. 4 illustrates operational processes when the automation program creates additional anticipated incorrect responses and helpful hints on the computing device within the environment of FIG. 1, in accordance with an exemplary embodiment of the present invention.

FIG. 4 illustrates operational processes, generally designated 400, when automation program 104 creates additional anticipated incorrect responses and helpful hints on computing device 102 within the environment of FIG. 1, in accordance with an exemplary embodiment of the present invention.

In step 402, automation program 104 determines that an incorrect response provided by a user of a tutorial file is unanticipated. In other words, automation program 104 determines that the answer to decision 308 is "N" (FIG. 3).

In step 404, automation program 104 optionally queries a user who inputs an unanticipated incorrect response. In one embodiment, automation program 104 allows the user to make one or more unanticipated incorrect responses until the user seems to give up (e.g., the user activity has ceased for a selected period of time) or, alternatively, the user figures out what the correct response is. Automation program 104 asks the user to input helpful hints or other useful information that would assist another user who makes the same incorrect response in the future. In various embodiments, step 404 is done during beta testing of a tutorial file created using automation program 104. In other words, a community of users beta tests various tutorial files with the purpose of improving the files and creating a supply of helpful hints for future users.

In step 406, automation program 104 collects and stores any user input received from optional step 404 as well as recorded keystrokes, mouse clicks, mouse movement, etc. This data is then available for analysis by, for example, the creator of the tutorial. Alternatively, a community of users involved in beta testing of various tutorial files uses the data collected in step 406 to develop helpful hints for the files.

In various embodiments, automation program 104 analyzes the effectiveness of the stored helpful hints and sorts the helpful hints by their effectiveness. For example, if a first helpful hint is rarely followed by a correct response, then the first helpful hint will only be output by automation program 104 after more effective helpful hints have been tried first unsuccessfully.

Figure 5:
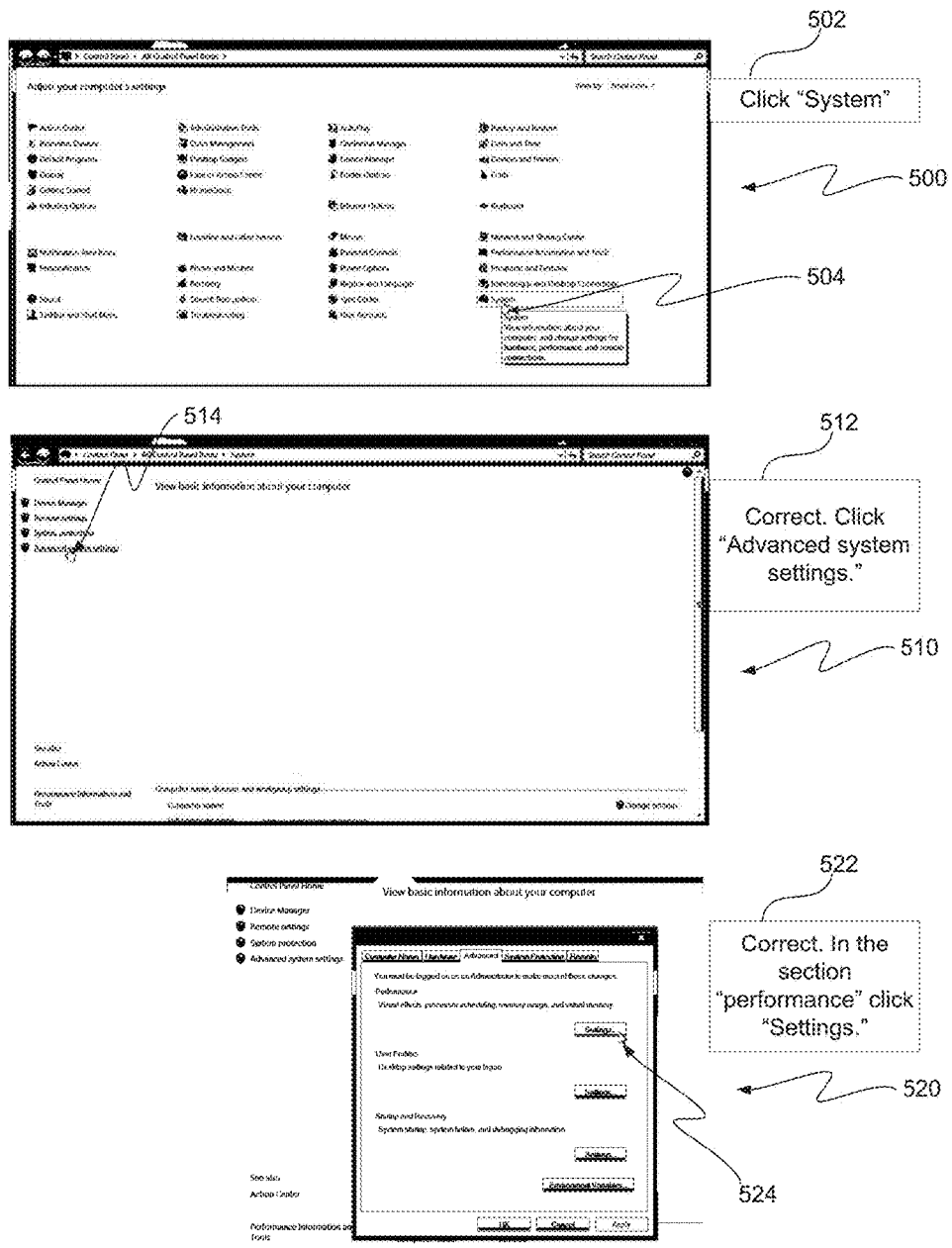
FIG. 5 is a first example of a graphical user interface (GUI) when the automation program is guiding a user through a first series of instructions on a computing device within the environment of FIG. 1, in accordance with an exemplary embodiment of the present invention.

FIG. 5 is a first example of a GUI when automation program 104 is guiding a user through a first series of instructions on computing device 102 within the environment of FIG. 1, in accordance with an exemplary embodiment of the present invention.

Windows 500, 510, and 520 depict windows that are displayed as a user navigates through a control panel of a computing device. The tutorial provides instructions 502, 512, and 522 thereby showing the user how to modify performance settings on the computing device.

In this example, instruction 502 is output by automation program 104 (e.g., FIG. 3, step 302) directing the user of the tutorial to click the "System" icon in window 500. The user moves pointer 504 to highlight the "System" icon and clicks on the icon. As a result of pointing to and clicking on the "System" icon, window 510 appears. Because clicking on the "System" icon was what automation program 104 instructed the user to do with instruction 502, automation program 104 automatically outputs instruction 512 indicating the next step in the tutorial. The user is not required to remember which instructions have been completed or to manually input a command to go to the next instruction.

Following instruction 512, the user moves pointer 514 to the "Advanced system settings" link and clicks on the link. As a result of pointing to and clicking on the "Advanced system settings" link, window 520 appears. Because clicking on the "Advanced system settings" link was what automation program 104 instructed the user to do with instruction 512, automation program 104 automatically outputs instruction 522 indicating the next step in the tutorial. The user moves pointer 524 to the "Settings" button and clicks on it per instruction 522. Depending on the correctness of the user operation, one of the following will be output by automation program 104: i) The next tutorial step instruction (indicating the user was correct and the tutorial has at least one more step); ii) a message indicating the tutorial was successfully completed; iii) a message telling the user the response was incorrect and a hint guiding the user to make a different response to the instruction; or iv) a message telling the user the response was incorrect with no hint given because the incorrect response was not an anticipated incorrect response with an available helpful hint.

Figure 6:
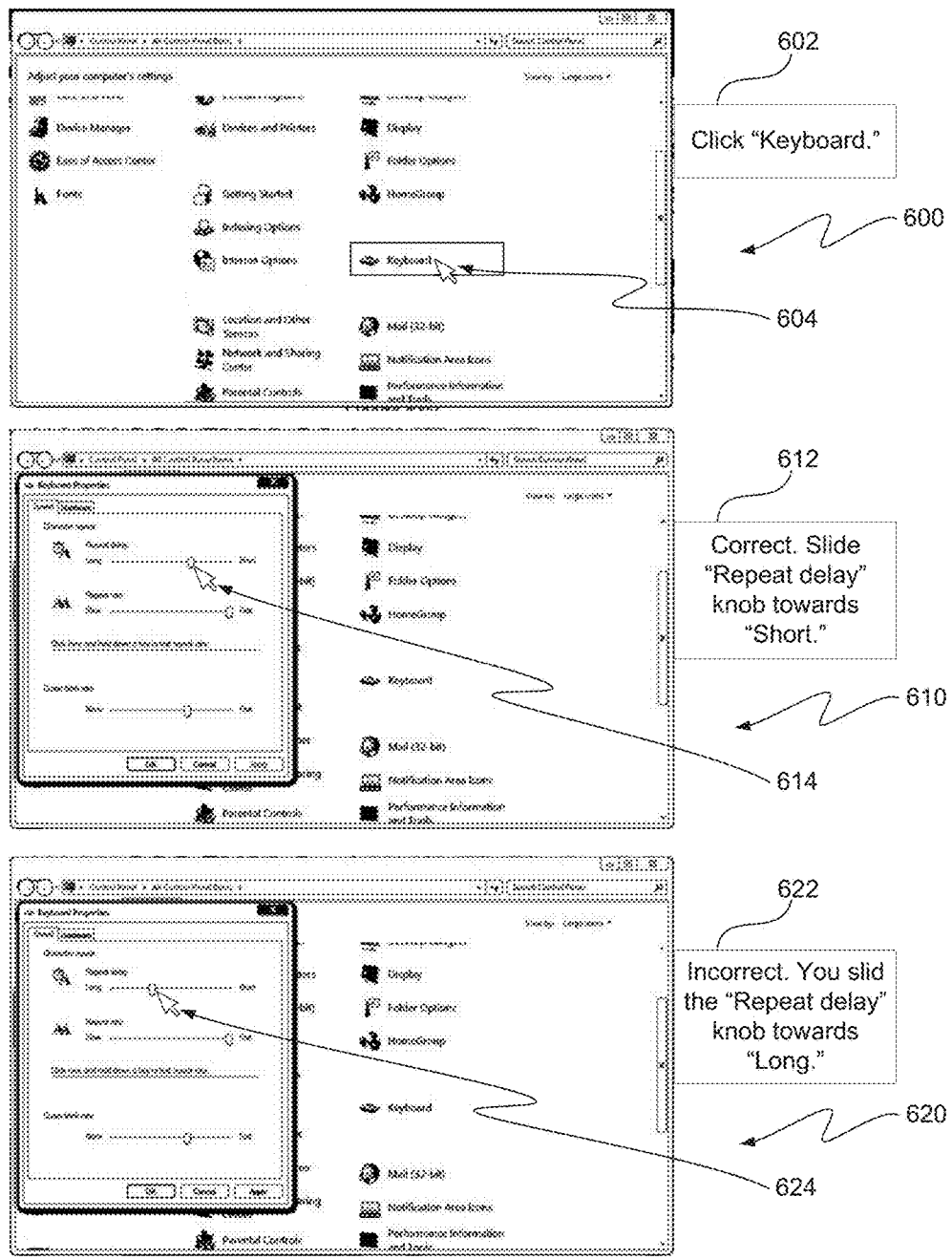
FIG. 6 is a second example of a GUI when the automation program is guiding a user through a second series of instructions on a computing device within the environment of FIG. 1, in accordance with an exemplary embodiment of the present invention.

FIG. 6 is a second example of a GUI when automation program 104 is guiding a user through a second series of instructions on computing device 102 within the environment of FIG. 1, in accordance with an exemplary embodiment of the present invention.

Windows 600, 610, and 620 depict windows that are seen during a tutorial showing a user how to navigate through a control panel of a computing device. The tutorial is showing the user how to modify keyboard settings on the computing device.

In this example, instruction 602 is output by automation program 104 directing the user of the tutorial to click the "Keyboard" icon in window 600. The user moves pointer 604 to highlight the "Keyboard" icon and clicks on the icon. As a result of pointing to and clicking on the "Keyboard" icon, window 614 appears. Because clicking on the "Keyboard" icon was what automation program 104 instructed the user to do with instruction 602, automation program 104 automatically outputs instruction 612 indicating the next step in the tutorial. The user is not required to remember which instructions have been completed or to manually input a command to go to the next instruction.

Incorrectly following instruction 612, the user moves pointer 614 in order to slide the "Repeat delay" knob towards "Long" instead of towards "Short." As a result of the incorrect response, helpful hint 622 automatically appears informing the user that he or she made an anticipated error.

Figure 7:
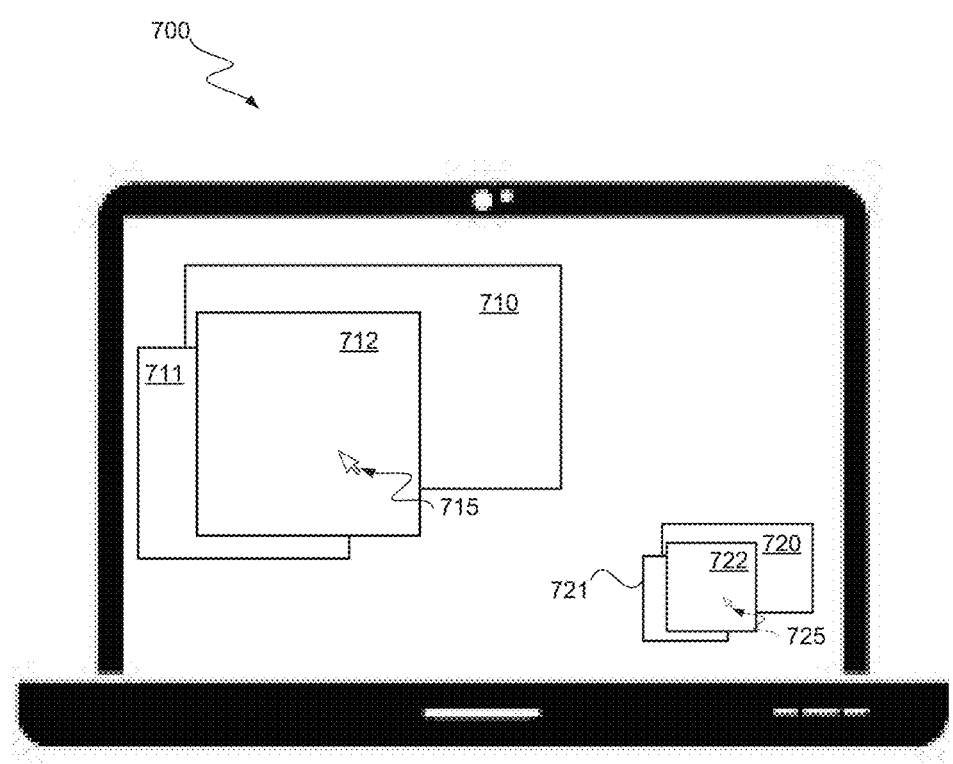
FIG. 7 is a third example of a screenshot as the automation program guides a user through a tutorial on the computing device within the environment of FIG. 1, in accordance with an exemplary embodiment of the present invention.

FIG. 7 is a third example of a screenshot, generally designated 700, as automation program 104 guides a user through a tutorial on computing device 102 within the environment of FIG. 1, in accordance with an exemplary embodiment of the present invention.

Screenshot 700 shows two sets of GUI windows, each containing three windows. The larger set of GUI windows, 710-712, are actual windows that are being opened by a user taking the tutorial. The smaller set of GUI windows, 720-722, are graphical instructions provided by automation program 104, which the user is following. The two sets of GUI windows are visually identical except in terms of scale. In other words, GUI window 720 is a smaller scale version of GUI window 710, GUI window 721 is a smaller scale version of GUI window 711, and GUI window 722 is a smaller scale version of GUI window 712.

The user is on the third step of the tutorial when the screenshot is taken. During the first step of the depicted tutorial, only GUI windows 710 and 720 are seen by the user. The tutorial instructs the user to point and click on an object on window 710 by showing pointer 725 pointing and clicking on the same smaller object in window 720. The user correctly points and clicks on the corresponding larger object in window 710 with pointer 715 thereby triggering the appearance of identical (except for scale) GUI windows 711 and 721. At this point a second visual instruction is provided to the user by automation program 104. The second visual instruction is conveyed by showing the user where to point and click with pointer 715 on window 711 by showing pointer 725 pointing to the same (but smaller) object on window 721. Once the user correctly follows the second visual instruction from automation program 104, GUI windows 712 and 722 appear. Screenshot 700 shows the instance of the tutorial when the user is using pointer 715 to follow the visual instructions given by automation program 104 with pointer 725.

FIGS. 5 and 6 illustrated embodiments of the present invention whereby textual instructions provided by automation program 104 were followed by a user on a GUI. FIG. 7 illustrated embodiments whereby graphical instructions provided by automation program 104 were followed by a user on a GUI. Embodiments of the present invention are not limited by these three examples. For example, instructions provided by automation program 104 to a user taking a tutorial are capable of being generated using both textual and graphical means.

Figure 8:
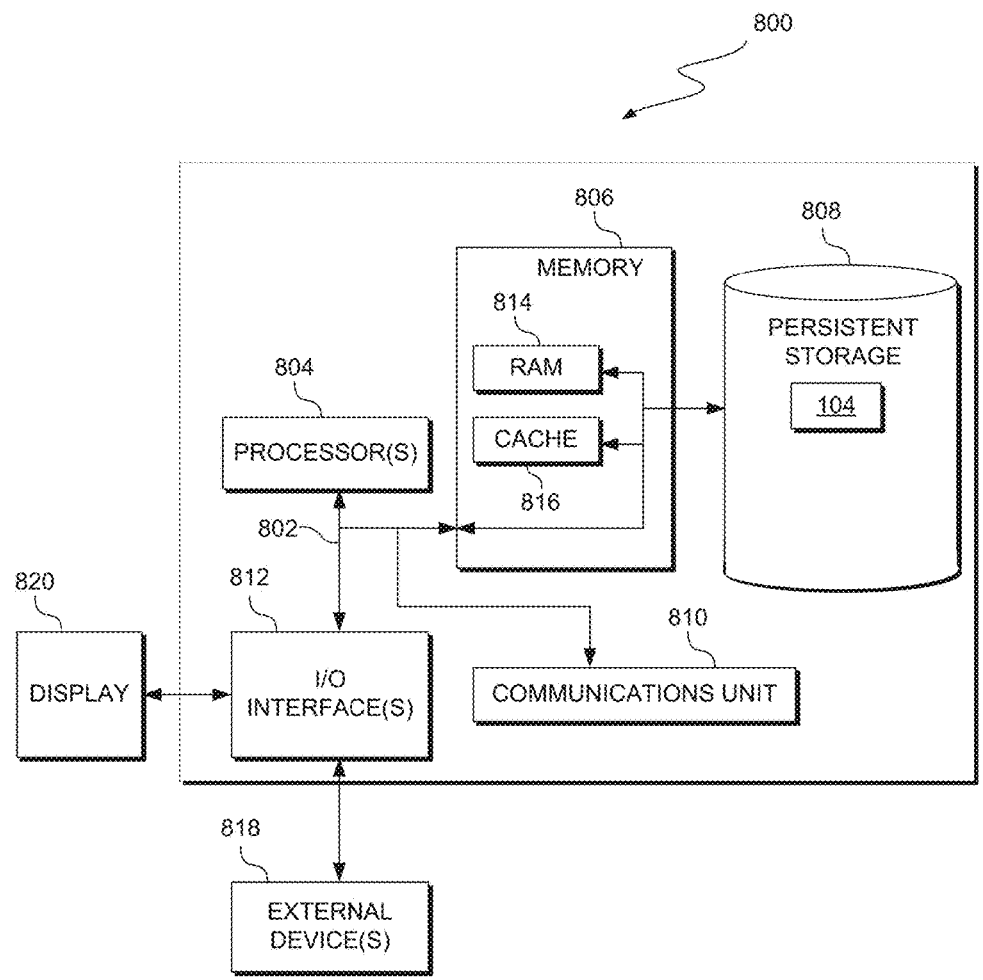
FIG. 8 depicts a block diagram of components of the computing device executing the automation program, in accordance with an exemplary embodiment of the present invention.

FIG. 8 depicts a block diagram, 800, of components of computing device 102, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

Computing device 102 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer-readable storage media. In this embodiment, memory 806 includes random access memory (RAM) 814 and cache memory 816. In general, memory 806 can include any suitable volatile or non-volatile computer-readable storage media.

Automation program 104 is stored in persistent storage 808 for execution and/or access by one or more of the respective computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer-readable storage medium that is also part of persistent storage 808.

Communications unit 810, in these examples, provides for communications with other data processing systems or devices, including resources of network 108. In these examples, communications unit 810 includes one or more network interface cards. Communications unit 810 may provide communications through the use of either or both physical and wireless communications links. Automation program 104 may be downloaded to persistent storage 808 through communications unit 810.

I/O interface(s) 812 allows for input and output of data with other devices that may be connected to computing device 102. For example, I/O interface 812 may provide a connection to external devices 818 such as a keyboard, keypad, a touch screen, and/or some other suitable input device. External devices 818 can also include portable computer-readable storage media such as, for example, thumb drives, portable optical or magnetic disks, and memory cards. Software and data used to practice embodiments of the present invention, e.g., automation program 104, can be stored on such portable computer-readable storage media and can be loaded onto persistent storage 808 via I/O interface(s) 812. I/O interface(s) 812 also connect to a display 820.

Display 820 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   providing, by one or more processors, a first instruction to a first user;
   receiving, by one or more processors, a first user input in response to the first instruction provided to the first user;
   determining, by one or more processors, whether the first user input is a correct response to the first instruction;
   responsive to determining that the first user input is the correct response to the first instruction, providing automatically, by one or more processors, a second instruction to the first user without requiring the first user to track status of the first instruction or manually input a subsequent instruction;
   receiving, by one or more processors, a second user input in response to the second instruction provided to the first user;
   determining, by one or more processors, whether the second user input is an unanticipated incorrect response to the second instruction;
   responsive to determining that the second user input is the unanticipated incorrect response to the second instruction, querying, by one or more processors, the first user for an additional input that includes one or more potential hints, wherein the potential hints provide guidance to a future user for inputting a correct response to an instruction; and
   determining, by one or more processors, one or more new hints based on the additional input.

2. The method of claim 1 further comprising:
   responsive to determining that the second user input is the unanticipated incorrect response to the first instruction, storing, by one or more processors, a keylogging input by the second user for a future analysis.

3. The method of claim 1 wherein one or more of: the first user input, the second user input, the first instruction and the second instruction are one or both graphical and textual in nature.

4. The method of claim 1 further comprising;
   identifying, by one or more processors, one or more instructions from a creator of a tutorial; and
   identifying, by one or more processors, one or more correct responses to the one or more instructions from the creator of the tutorial.

5. The method of claim 4 further comprising;
   identifying, by one or more processors, one or more anticipated incorrect responses to the one or more instructions from the creator of the tutorial; and
   identifying, by one or more processors, one or more hints from the creator of the tutorial, wherein the one or more hints enable one or more users taking the tutorial to provide the one or more correct responses after initially providing the one or more anticipated incorrect responses.

6. A computer program product comprising:
   one or more computer-readable storage media and program instructions stored on at least one of the one or more computer-readable storage media, the program instructions comprising:
   program instructions to provide a first instruction to a first user;
   program instructions to receive a first user input in response to the first instruction provided to the first user;
   program instructions to determine whether the first user input is a correct response to the first instruction;
   program instructions to provide automatically a second instruction to the first user without requiring the first user to track status of the first instruction or manually input a subsequent instruction responsive to determining that the first user input is the correct response to the first instruction;
   program instructions to receive a second user input in response to the second instruction provided to the first user;
   program instructions to determine whether the second user input is an unanticipated incorrect response to the second instruction;
   program instructions to query the first user for an additional input that includes one or more potential hints, wherein the potential hints provide guidance to a future user for inputting a correct response to an instruction responsive to determining that the second user input is the unanticipated incorrect response to the second instruction; and
   program instructions to determine one or more new hints based on the additional input.

7. The computer program product of claim 6 further comprising:
   responsive to determining that the second user input is the unanticipated incorrect response to the first instruction, program instructions store a keylogging input by the second user for a future analysis.

8. The computer program product of claim 6 wherein one or more of:
   the first user input, the second user input, the first instruction and the second instruction are one or both graphical and textual in nature.

9. The computer program product of claim 6 further comprising:
   program instructions to identify one or more instructions from a creator of a tutorial; and
   program instructions to identify one or more correct responses to the one or more instructions from the creator of the tutorial.

10. The computer program product of claim 9 further comprising:

program instructions to identify one or more anticipated incorrect responses to the one or more instructions from the creator of the tutorial; and program instructions to identify one or more hints from the creator of the tutorial, wherein the one or more hints enable one or more users taking the tutorial to provide the one or more correct responses after initially providing the one or more anticipated incorrect responses.

11. A computer system comprising:

one or more computer processors;

one or more computer-readable storage media; and program instructions to provide a first instruction to a first user;

program instructions to receive a first user input in response to the first instruction provided to the first user;

program instructions to determine whether the first user input is a correct response to the first instruction;

program instructions to provide automatically a second instruction to the first user without requiring the first user to track status of the first instruction or manually input a subsequent instruction responsive to determining that the first user input is the correct response to the first instruction;

program instructions to receive a second user input in response to the second instruction provided to the first user;

program instructions to determine whether the second user input is an unanticipated incorrect response to the second instruction;

program instructions to query the first user for an additional input that includes one or more potential hints, wherein the potential hints provide guidance to a future user for inputting a correct response to an instruction responsive to determining that the second user input is the unanticipated incorrect response to the second instruction; and program instructions to determine one or more new hints based on the additional input.

12. The computer system of claim 11 further comprising:

responsive to determining that the second user input is the unanticipated incorrect response to the first instruction, program instructions store a keylogging input by the second user for a future analysis.

13. The computer program product of claim 6 wherein one or more of:

the first user input, the second user input, the first instruction and the second instruction are one or both graphical and textual in nature.

14. The computer system of claim 11 further comprising:

program instructions to identify one or more instructions from a creator of a tutorial; and program instructions to identify one or more correct responses to the one or more instructions from the creator of the tutorial.

* * * * *